United States Patent [19]

Nishimura et al.

[11] Patent Number: 4,792,028

[45] Date of Patent: Dec. 20, 1988

[54] END-BEARING EQUIPPED ONE-WAY CLUTCH

[75] Inventors: Shigeharu Nishimura; Norio Kamiyama, both of Kanagawa, Japan

[73] Assignee: NSK-Warner K.K., Tokyo, Japan

[21] Appl. No.: 63,437

[22] Filed: Jun. 18, 1987

[30] Foreign Application Priority Data

Jun. 24, 1986 [JP] Japan .................................. 61-146207

[51] Int. Cl.$^4$ ........................ F16D 15/00; F16D 41/07
[52] U.S. Cl. ................................. 192/41 A; 192/41 R;
192/45.1; 384/489; 384/905.1
[58] Field of Search ................ 192/41 A, 45.1, 45,
192/41 R; 384/132, 513, 564, 905.1, 481, 489

[56] References Cited

U.S. PATENT DOCUMENTS

| | | | |
|---|---|---|---|
| 2,427,120 | 9/1947 | Blair | 192/45.1 X |
| 2,912,086 | 11/1959 | Troendly et al. | 192/45.1 |
| 4,494,636 | 1/1985 | Wakabayashi et al. | 192/45.1 X |
| 4,635,770 | 1/1987 | Shoji et al. | 192/41 A |

FOREIGN PATENT DOCUMENTS 2248481  4/1973  Fed. Rep. of Germany ........ 192/45

*Primary Examiner*—Rodney H. Bonck
*Attorney, Agent, or Firm*—Wegner & Bretschneider

[57] ABSTRACT

An end-bearing equipped one-way clutch includes an outer and inner rotary members, torque-transmitting members arranged between the first and second rotary members, retainers maintaining the torque-transmitting members with equal angular intervals and having radially-extending annular flanges at one axial end portions thereof, and end bearings arranged respectively along both axial ends of the retainers maintaining the first and second rotary members in a concentric relation. One of the end bearings, which is arranged on the side opposite to the flanges, is composed of a first cylindrical portion fit in the outer rotary member, a second cylindrical portion fit on the inner rotary member and a toroidal plate portion connecting the first and second cylindrical portions to each other. A reinforcement member is formed at each of the first and second cylindrical portions so as to improve the rigidity against each load to be applied in the radial direction to the end bearing provided on the side opposite to the flanges.

4 Claims, 2 Drawing Sheets

END-BEARING EQUIPPED ONE-WAY CLUTCH

BACKGROUND OF THE INVENTION (1) Field of the Invention

This invention relates to a one-way clutch, and more specifically to an end-bearing equipped one-way clutch which has rigidity improved in the radial direction.

(2) Description of the Prior Art

In a one-way clutch employed in an automatic transmission or the like, the support of the one-way clutch has heretofore been effected by arranging, on both sides of the one-way clutch slide, bearings which have been obtained by press-forming a metal plate and are called "end bearings".

Such end bearings also serve to ensure the centering of associated outer and inner races and the centering of associated outer and inner retainers of the one-way clutch. They also function as a receptacle for an oil which enters the one-way clutch.

In a one-way clutch, it is a general arrangement that an inner race is fixed and an outer race is allowed to idle or on the contrary, the outer race is fixed and the inner race is allowed to idle. Whichever arrangement is employed, rotary members such as planetary gear and friction plates are attached to the idling side so that the overall weight is substantial.

However, the center of gravity of the rotary members is not located in a central part of the end bearings but is found at a position further outside the end bearing on the side of the rotary members. The end bearing on the side of the rotary members is hence subject to significant loads, especially, in the radial direction.

Because engines, and thus the transmission gears, are being driven at higher revolutionary speeds these days, this loading imbalance has become more pronounced. The end bearing on the side of the rotary members may therefore be worn. It has also been found that end bearings obtained by press-forming a steel plate are deformed due to their insufficient rigidity, for example, as shown in FIG. 3 and subjected to greater wearing and abrasion when greater loads are applied to the end bearings.

In FIG. 3, an inner race 3 is fixed while an outer race 1 is allowed to idle. Flange portions 5a of an end bearing 5, which is provided on the side of flange portions 7a,9a of outer and inner cages 7,9, are therefore bent, namely, deformed toward their corresponding flange portions 7a,9a of the outer and inner cages 7,9 due to loads applied radially by rotary members on the side of the outer race. If such a state occurs, the end bearings 5 is worn so that its centering function, namely, the function of the one-way clutch is affected adversely.

On the side opposite to the flanges 7a,9a in particular, the radial clearances between the outer and inner cages 7,9 and the associated end bearing are still greater. It is therefore difficult to achieve the centering of both cages on the side opposite to the flanges 7a,9a.

SUMMARY OF THE INVENTION

An object of this invention is therefore to provide a wear and abrasion resistant one-way clutch having an improved centering function, in which an end bearing having enhanced rigidity by a simple construction is arranged on the side of rotary members, namely, on the side subjected to greater loads.

In one aspect of this invention, there is thus provided an end-bearing equipped one-way clutch which comprises an outer and inner rotary members arranged with a radial interval therebetween, rotatably relative to each other and concentrically with each other and having axially-extending inner and outer peripheral bearing surfaces respectively, torque-transmitting members arranged between the first and second rotary members for transmitting torques between the bearing surfaces, a combination of retainers maintaining the torque-transmitting members with equal angular intervals and having radially-extending annular flanges at one axial end portions thereof, and a combination of end bearings arranged respectively along both axial ends of the retainers maintaining the first and second rotary members in a concentric relation. One of the end bearings, which is arranged on the side opposite to the flanges, is composed of a first cylindrical portion fit in the inner peripheral bearing surface of the outer rotary member, a second cylindrical portion fit on the outer peripheral bearing surface of the inner rotary member and a toroidal plate portion connecting the first and second cylindrical portions to each other. A reinforcement means is formed at each of the first and second cylindrical portions so as to improve the rigidity against each load to be applied in the radial direction to the end bearing provided on the side opposite to the flanges.

Since the cylindrical portions of the end bearing on the side opposite to the flange are provided with the reinforcement means, the one-way clutch of this invention can fully withstand loads to be applied in the radial direction.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
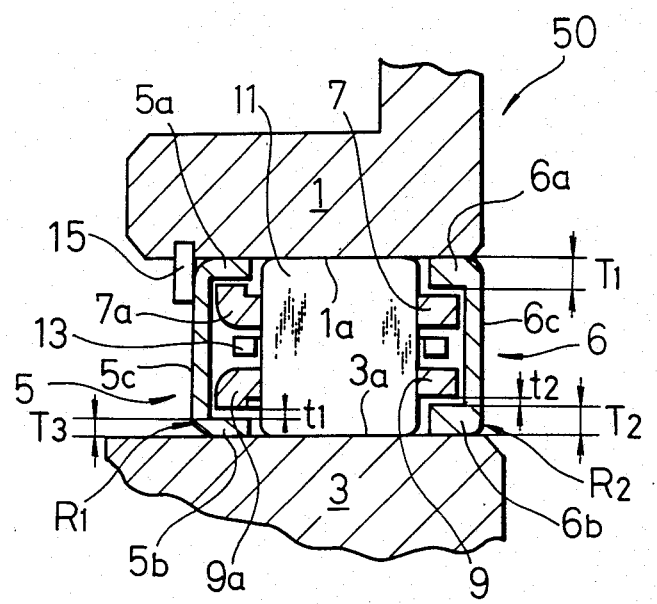
FIG. 1 is a fragmentary radial cross-section of a one-way clutch according to one embodiment of this invention.
Figure 2:
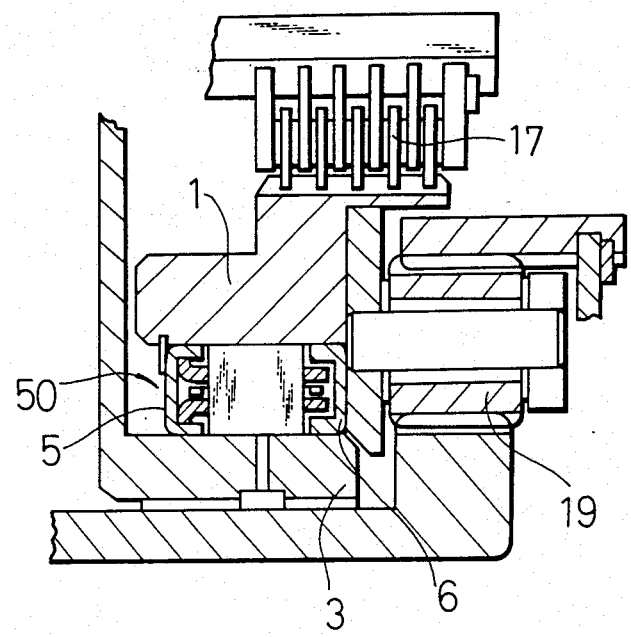
FIG. 2 shows the one-way clutch of FIG. 1 assembled in an automatic transmission.
Figure 3:
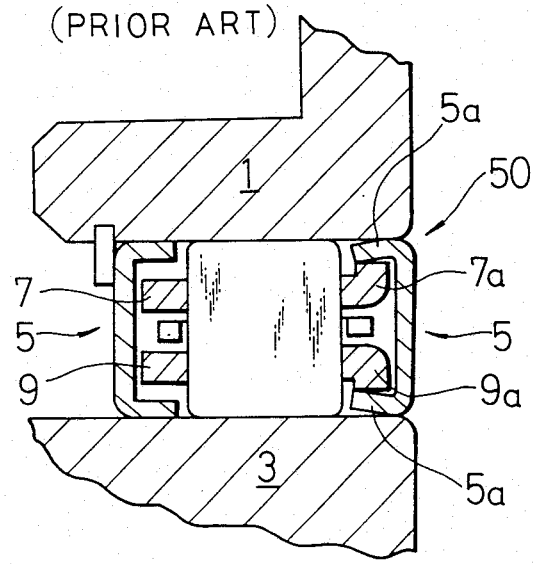
FIG. 3 is a fragmentary axial cross-section showing drawbacks of a conventional one-way clutch.

Referring now to FIGS. 1 and 2, the one embodiment of this invention will hereinafter be described in detail, in which like elements of structure will be indicated by like reference numerals.

First of all, the structure and operation of the one-way clutch of this invention will be described with reference to FIG. 1. A one-way clutch 50 is composed of an outer race 1 having an inner peripheral bearing surface (hereinafter called "inner race surface") 1a, an inner race 3 having an outer peripheral bearing surface (hereinafter called "outer race surface"), a plurality of sprags 11 arranged between the outer and inner races 3,1 and engageable with the respective race surfaces to transmit a torque therebetween, an outer and inner retainers (hereinafter called "cages") 7,9 maintaining the sprags 11 with equal radial intervals, a ribbon spring 13 arranged between the cages 7,9 and adapted to apply a moment to each sprag 11 in such a direction that the sprag 11 engages both inner and outer race surfaces, and end bearings 5,6.

On the side opposite to rotary members such as friction plates, an annular retainer is fixed on the outer race 1. The retainer 15 prevents the end bearing 5 from slipping out axially. In the above-described construction, the first rotary member, namely, the outer race 1 is maintained in an idling state while the second rotary member, namely, the inner race 3 is fixed. On the side of the end bearing 5, flanges 7a,9a are provided respectively on axial outer end portions of the outer and inner cages 7,9. The flanges 7a,9a extend radially toward the outer and inner races 1,3 respectively.

The end bearings 5,6 are composed respectively of first cylindrical portions maintained in slidable relation with the outer race 1, i.e., outer flange portions 5a,6a, second cylindrical portions maintained in slidable relation with the inner race 3, i.e., inner flange portions 5b,6b, and toroidal plate portions 5c,6c connecting respectively the outer flange portions 5a,6a and the inner flange portions 5b,6b to each other.

Here, a conventional press-formed end bearing of a low price can be used as the end bearing 5. On the other hand, it is preferable to form the end bearing 6 by cutting work. In FIG. 1, the flange portions 6a, 6b of the end bearing 6 to which loads are applied in the radial direction have a greater thickness, specifically, a greater radial thickness than the flange portions 5a,5b of the end bearing 5. Namely, the end bearing 6 is thus provided with a reinforcement means. More specifically, the end bearing 5 has a uniform thickness $T_3$ while the radial thicknesses $T_1$ and $T_2$ of the flange portions 6a,6b are greater than the axial thickness of the toroidal plate portion 6c. The thicknesses $T_1$ and $T_2$ are substantially greater than the thickness $T_3$. In order to reduce the axial overall dimension of the one-way clutch, it is preferable to make the thickness of the toroidal plate portion 6c substantially equal to the thickness of the thickness of the toroidal plate portion 5c. The thicknesses $T_1$ and $T_2$ are substantially the same in FIG. 1. Their relative thicknesses may however vary freely as needed, provided that they are maintained greater than the thickness $T_3$.

On the side of the outer and inner flanges 7a,9a of the outer and inner cages 7,9, the conventional end bearing 5 is provided. The end bearing 6 having the thicker flange portions 6a,6b is provided on the side opposite to the outer and inner flanges 7a,9a. Incidentally, the outer and inner flanges 7a,9a are required to maintain the strengths of the outer and inner cages 7,9.

As readily envisaged from FIG. 1, the end bearing 5 has an axially-outer corner $R_1$ on a connecting part between the toroidal plate portion 5c and each of the flange portions 5a,5b. On the other hand, the end bearing 6 also has an axially-outer corner $R_2$ on a connecting part between the toroidal plate portion 6c and each of the flange portions 6a,6b. Since the end bearing 5 has been obtained by press-forming work, the corner $R_1$ radius of curvature of is greater than that of the corner $R_2$, i.e., corner $R_2$ is sharper than corner $R_1$. Owing to this construction, the end bearing 6 is maintained over relatively wide areas in contact with the outer and inner races 1,3. In contrast, the areas of contact between the end bearing 5 and the outer and inner races 1,3 are relatively small. As a result, the bearing performance of the end bearing 6 is higher compared with conventional bearings.

Incidentally, the corners $R_2$ of the end bearing 6 may be formed by cutting work.

The clearance $t_2$ between the axial ends of the outer and inner cages 7,9, said axial ends being on the side opposite to the flanges 7a,9a, and the flange portions 6a,6b of the end bearing 6 is substantially the same as the clearance $t_1$ between the flange portions 5a,5b of the end bearing 5 and the radial ends of the flanges 7a,9a of the corresponding outer and inner cages 7,9. This construction has improved the centering performance for the outer and inner cages 7,9 so that movements of the outer and inner cages 7,9 are stabilized.

Referring next to FIG. 2, a description will be made of the one-way clutch according to the above-described embodiment of this invention in a state assembled in an automatic transmission. The one-way clutch 50 is disposed between the outer race 1 and inner race 3. As already described above, the inner race 3 is fixed and the outer race 1 hence serves as the idling side. Since the thicknesses of the flange portions of the end bearing 6 on the right-hand side as viewed in FIG. 2 is greater, the one-way clutch can withstand stringent loads to be applied from rotary members, namely, friction plates 17 and planetary gear 17.

As has been described above, the one-way clutch of this invention has numerous advantages, for example, the following advantages.

(a) The thicknesses of the flange portions 6a,6b of the end bearing 6 are greater. The rigidity of the end bearing 6 has hence been improved, whereby the end bearing 6 can withstand large loads without deformation. Therefore, the wearing and abrasion resistance of the one-way clutch has been improved substantially.

(b) Owing to the arrangement of the end bearing 6 with the thicker flanges 6a,6b on the side opposite to the flanges 7a,9a of the outer and inner cages 7,9, movements of the cages 7,9 have been stabilized and the centering performance for the cages 7,9 has been also improved.

(c) When the end bearing 6 with the thicker flanges 6a,6b is formed by cutting work, its corner $R_2$ can be formed smaller compared with press-formed end bearings. The bearing surfaces can therefore be increased, so that the bearing performance is improved, a lubricating oil is rendered less susceptible to leakage and the function of the end bearings as an oil receptacle is also improved.

Having now fully described the invention, it will be apparent to one of ordinary skill in the art that many changes and modifications can be made thereto without departing from the spirit or scope of the invention as set forth herein.

We claim:

1. In an end-bearing equipped one-way clutch comprising outer and inner rotary members arranged with a radial interval therebetween, rotatably relative to each other and concentrically with each other and having axially-extending inner and outer peripheral bearing surfaces respectively, torque-transmitting members arranged between the first and second rotary members for transmitting torques between the bearing surfaces, a combination of retainers maintaining the torque-transmitting members with equal angular intervals and having radially-extending annular flanges at one axial end portions thereof, and a combination of end bearings arranged respectively along both axial ends of the retainers maintaining the first and second rotary members in a concentric relation, the improvement wherein one of the end bearings, which is arranged on the side opposite to the flanges, is composed of a first cylindrical portion fit in the inner peripheral bearing surface of the outer rotary member, a second cylindrical portion fit on the outer peripheral bearing surface of the inner rotary member and a toroidal plate portion connecting the first and second cylindrical portions to each other, and a reinforcement means is formed at each of the first and second cylindrical portions so as to improve the rigidity against each load to be applied in the radial direction to the end bearing provided on the side opposite to the flanges.

2. The one-way clutch as claimed in claim 1, wherein the reinforcement means is formed by making the thickness of each of the first and second cylindrical portions thicker than the toroidal plate portion.

3. The one-way clutch as claimed in claim 2, wherein the thickness of the toroidal portion of the end bearing arranged on the side opposite to the flanges is substantially the same as the thickness of the end bearing arranged on the side of the flanges.

4. The one-way clutch as claimed in claim 1, wherein the end bearing arranged on the side of the flanges is composed of a first cylindrical portion fit in the outer rotary member, a second cylindrical portion fit on the inner rotary member and a toroidal plate portion connecting the first and second cylindrical portions, and a connecting part between the toroidal plate portion and each of the first and second cylindrical portions of the end bearing arranged on the side opposite to the flanges has, when viewed in a radial cross-section of the one-way clutch, a smaller axially-outer corner than a connecting part between the toroidal plate portion and each of the first and second cylindrical portions of the end bearing arranged on the side of the flanges.

* * * * *